United States Patent [19]

Diederich, Jr.

[11] 4,278,275
[45] Jul. 14, 1981

[54] UNIVERSAL COUPLING ADAPTER FOR REMOTE FLUID COOLING OR FILTERING

[76] Inventor: Paul W. Diederich, Jr., 633 Hunters Trail, Glendora, Calif. 91740

[21] Appl. No.: 87,101

[22] Filed: Oct. 22, 1979

[51] Int. Cl.³ ............................................ F16L 39/00
[52] U.S. Cl. ..................................... 285/12; 285/131; 285/137 R; 285/177
[58] Field of Search ................... 285/131, 133 R, 12, 285/351, 137 R, 177; 210/DIG. 17

[56] References Cited

U.S. PATENT DOCUMENTS

| | | | |
|---|---|---|---|
| 1,684,582 | 9/1928 | Hoaglund | 284/177 X |
| 2,025,067 | 12/1935 | Miller | 285/177 |
| 2,387,324 | 10/1945 | Glickman | 285/177 X |
| 3,095,124 | 6/1963 | Wesley | 285/177 X |
| 4,045,349 | 8/1977 | Humbert, Jr. | 285/177 X |
| 4,113,283 | 9/1978 | Curtis et al. | 285/12 |

FOREIGN PATENT DOCUMENTS

| | | | |
|---|---|---|---|
| 703513 | 3/1941 | Fed. Rep. of Germany | 285/133 R |
| 274240 | 5/1930 | Italy | 285/351 |
| 854189 | 11/1960 | United Kingdom | 285/351 |

*Primary Examiner*—Thomas F. Callaghan
*Attorney, Agent, or Firm*—B. F. Spencer

[57] ABSTRACT

A universal coupling adapter is disclosed for attachment to the fluid reservoir of an engine, transmission unit, or other hydraulic system in place of a standard spin-on fluid filter. The coupling adapter consists of a disk-shaped body having a first end surface provided with a plurality of concentric ridges intersticed with concentric grooves. A centrally-located threaded bore extends into the disk-shaped body from the first end surface. A cylindrically-shaped cavity located between the innermost concentric ridge and the centrally-threaded bore extends partially into the disk-shaped body from the first end surface. An inlet port, with passageway interconnected with the centrally-located bore, and an outlet port, with passageway interconnected with the cylindrically-shaped cavity, extend from the second end surface of the disk-shaped body. The concentric grooves are adapted for receiving O-rings to assure a fluid-tight seal between the first end surface of the adapter and the outlet surface of the fluid reservoir. The outlet and inlet ports allow fluid from the reservoir to be conveyed to a remotely-located fluid circulation device, such as a fluid filter, cooler, or both, and then returned to the reservoir.

5 Claims, 4 Drawing Figures

UNIVERSAL COUPLING ADAPTER FOR REMOTE FLUID COOLING OR FILTERING

BACKGROUND OF THE INVENTION

The present invention relates to the circulation of fluids for filtering and/or cooling, and, in particular, to an adapter for coupling a fluid reservoir to a remotely-located fluid filter or cooler.

Internal combustion engines used in today's vehicles generally are provided with a disposable oil filter removably attached to the engine block adjacent the oil reservoir housing. Such filters serve the function of removing sludge, foreign particles, and bits of metal from the circulating oil to maintain the lubricating properties of the oil and thereby increase engine life. These oil filters are available in a variety of types and sizes, dependent in part upon the size, type, and manufacture of the internal combustion engine for which they are designed to be used.

Filters are finding increased use for filtering fluids other than engine lubricating oil. Trucks, buses, and other large vehicles frequently employ filters attached to the transmission units to insure clean transmission fluid for the internal gears of a transmission system.

The popular fluid filters are of the removable, spin-on type and are provided with a central threaded bore adapted for screw-on engagement with the threaded nipple protruding from the oil circulating system at the fluid reservoir outlet of the engine or transmission housing. A fluid-tight seal is maintained between the flat face or surface of the spin-on filter and the outlet surface of the fluid reservoir by means of a compressible gasket or O-ring partially recessed within a circular groove in the surface of the filter. Fluid flows out from the reservoir around the exterior of the threaded nipple and into the filter unit through a plurality of circumferentially-disposed openings in the flat face of the filter. Fluid passes through the filtering material coaxially disposed around a porous central column and returns back to the circulation system through the centrally-threaded bore. An example of one type of spin-on filter usable with an internal combustion engine is illustrated in U.S. Pat. No. 3,300,049.

In addition to the filtering of engine oil and transmission fluid, it is important that such fluids be maintained within their operating temperature range. Under extreme operating conditions or in warm or tropical climates, both engine oil and transmission fluid tend to become overheated. Large numbers of today's vehicles have no provision for the external or remote cooling of engine oil, and only a relatively small number provide for externally cooling transmission fluid.

The present invention is concerned with improvements in the filtering and cooling of oil and transmission fluids by providing a means for circulating such fluids through a remotely-located fluid filter, fluid cooler, or both. The invention comprises an improved coupling adapter for attachment to the outlet of a fluid reservoir housing in place of a fluid filter. Fluid to be filtered or cooled, or both filtered and cooled, passes from the reservoir outlet through the adapter to a remotely-located filter or cooler, or both, and back through the adapter and into the fluid circulation system. The remote filter may be appropriately located for the convenience of service personnel, and the remote cooler for increased cooling efficiency.

A principal object of the present invention is to provide an improved adapter for use in coupling a remotely-located fluid circulation device to the fluid reservoir of an engine, transmission unit, or other hydraulic system.

A further object is to provide a spin-on coupling adapter usable with a variety of different sizes of fluid reservoir outlets, in place of a spin-on fluid filter, to enable the fluid within the reservoir to be remotely circulated.

Another object is to provide a spin-on coupling adapter having an increased spacing between its inlet and outlet ports.

The above objects of and the brief introduction to the present invention will be more fully understood, and further objects and advantages will become apparent, from a study of the following detailed description in connection with the drawings.

DESCRIPTION OF THE INVENTION

Figures 1, 2:
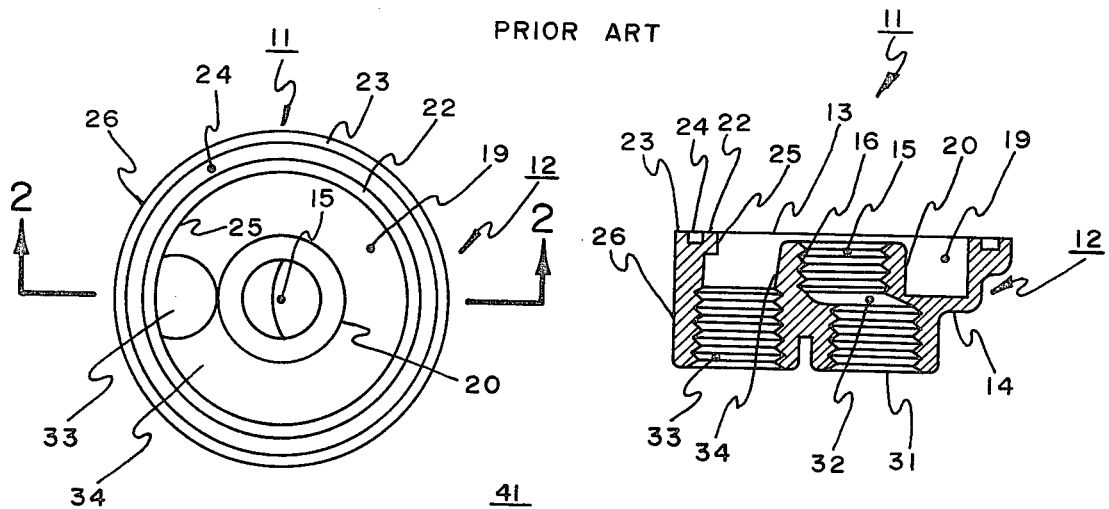
FIG. 1 is a top view of a prior art coupling adapter as viewed from the first end surface.
FIG. 2 is a side sectional view of the adapter of FIG. 1 taken along the lines 2—2.

Referring to FIGS. 1 and 2, a coupling adapter 11, representative of the prior art, is illustrated for use in coupling a remotely-located fluid circulation device, such as an oil filter, oil cooler, or both, to the outlet face or surface of the oil reservoir housing of an internal combustion engine in place of the standard, spin-on oil filter. Adapter 11 comprises a disk-shaped body 12 having a top or first end surface 13 and a lower or second end surface 14. A centrally-located bore 15 extends into disk-shaped body 12 from first end surface 13. A portion 16 of bore 15 adjacent first end surface 13 is threaded for screw-on engagement with the threaded nipple outlet of the oil reservoir housing.

A cylindrical well or cavity 19 extends partially into disk-shaped body 12 from first end surface 13 and surrounds the central portion 20 including bore 15. The diameter of cylindrical cavity 19 is less than the diameter of disk-shaped body 12, as shown.

First end surface 13 of disk-shaped body 12 is provided with a pair of concentric ridges 22 and 23 between which is situated a circular groove 24 extending partially into first end surface 13. The inner edge of ridge 22 is adjacent the outer peripheral surface 25 of cavity 19, and the outer edge of ridge 23 is adjacent the outer peripheral edge 26 of body 12. Circular groove 24 is adapted for receiving a compressible gasket or O-ring (not shown) to assure a fluid-tight seal between first end surface 13 and the outlet face or surface of the oil reservoir housing. The fluid-tight seal surrounds cylindrical cavity 19.

A centrally-located inlet port 31 extends outwardly from the second end surface 14 of body 12, as shown in FIG. 2. A portion of inlet port 31 is threaded. Passageway 32, located within body 12, interconnects inlet port 31 with bore 15.

An outlet port 33, laterally displaced from inlet port 31, extends from the second end surface 14 of body 12.

Outlet port 33 passes through body 12 and opens up into cylindrical cavity 19 through the bottom surface 34, as shown in FIG. 2.

Figure 3:
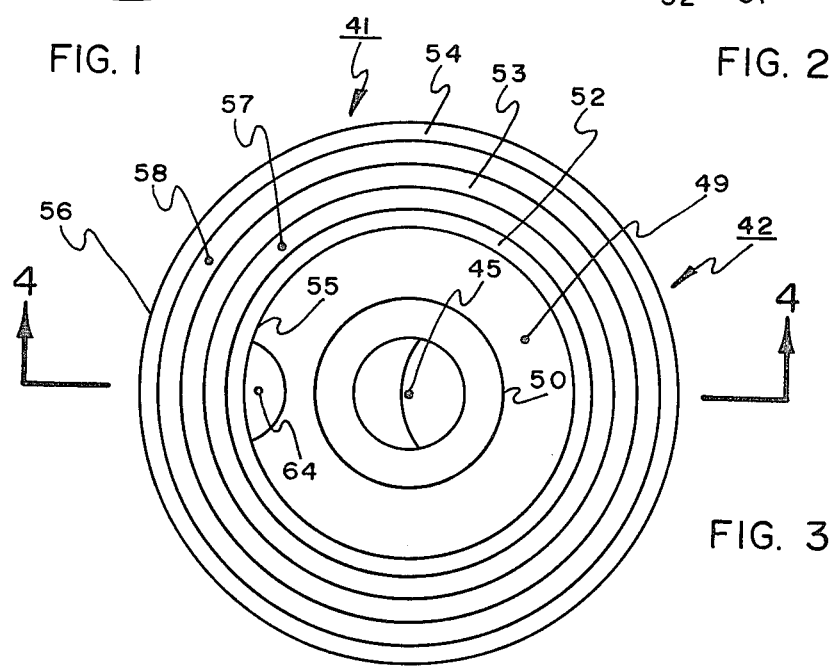
FIG. 3 is a top view of the improved universal coupling adapter of the invention as viewed from the first end surface.
Figure 4:
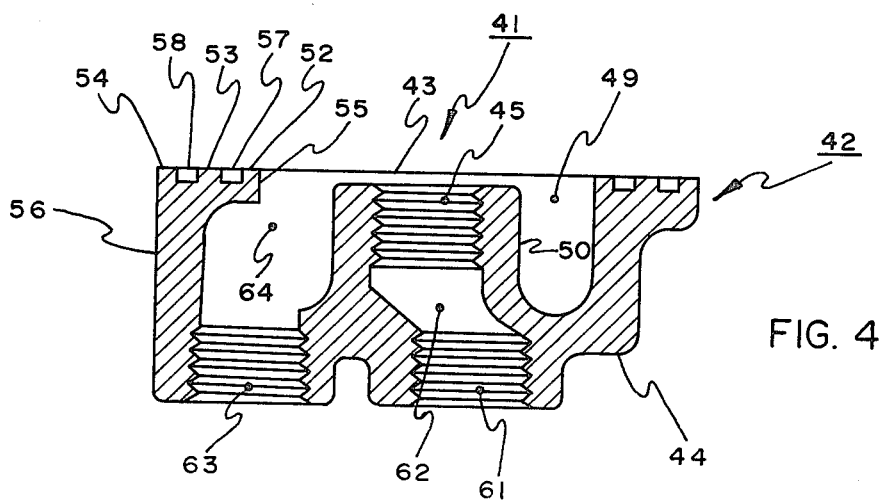
FIG. 4 is a side sectional view of the improved coupling adapter of FIG. 3 taken along the lines 4—4.

The improved coupling adapter 41 of the invention is illustrated in FIGS. 3 and 4. Adapter 41 consists of a generally disk-shaped body 42 having a top or first end surface 43 and a lower or second end surface 44. A centrally-located threaded bore 45 extends into body 42 from first end surface 43. Threaded bore 45 is adapted for screw-on engagement with the threaded nipple outlet of the fluid reservoir.

A cylindrically-shaped cavity 49 extends partially into body 42 from the first end surface 43. Cavity 49 surrounds the central portion 50 of body 42 including threaded bore 45. The upper end of central portion 50 falls slightly below the first end surface 43, as shown in FIG. 4.

Three concentric ridges 52, 53 and 54, of different diameters, are formed at first end surface 43 of body 42. The first or innermost ridge 52 is situated adjacent the outer peripheral surface 55 of cavity 49, and the third or outermost ridge 54 is adjacent the outer peripheral surface 56 of disk-shaped body 42.

An inner circular groove 57, extending partially into the first end surface 43, is located between the first and second concentric ridges 52, 53. An outer circular groove 58, located between the second and third concentric ridges 53, 54, extends partially into first end surface 43. Circular grooves 57 and 58 are adapted for receiving compressible gaskets or O-rings (not shown) in order to assure a fluid-tight coupling between the first end surface 43 and the outlet face or surface of the fluid reservoir housing. It is not necessary, however, that both grooves 57 and 58 be provided with O-rings to achieve a fluid-tight seal. Only one O-ring is required depending upon the type of spin-on fluid filter which adapter 41 is intended to replace, as will be explained below.

A cylindrically-shaped inlet port 61, laterally displaced from the axis of threaded bore 45, extends outwardly from the second end surface 44 of disk-shaped body 42, as shown in FIG. 4. A central passageway 62, situated within body 42, interconnects laterally-displaced inlet port 61 with bore 45. The lower portion of inlet port 61 is threaded.

A cylindrically-shaped outlet port 63, whose outer edge coincides with the outer peripheral surface 56 of body 42, extends outwardly from second end surface 45. Cylindrical outlet port 63 extends into body 42 terminating beneath the first and second concentric ridges 52, 53 and the inner circular groove 57, as shown in FIG. 4. The lower portion of outlet port 63 is threaded.

An opening 64 is provided from the outer peripheral surface 55 of cavity 49, beneath first and second concentric ridges 52, 53 and inner circular groove 57, into the upper end of cylindrical outlet port 61, as shown in FIG. 4. Opening 64 allows fluid to flow from cavity 49 into outlet port 63.

The improved coupling adapter of the invention may be manufactured by the injection molding process using molten metal under high pressure. Either aluminum or brass may be employed. The centrally-located bore and the inlet and outlet ports are threaded after completion of the molding process. The injection mold employed may include provisions for molding, radially extending reinforcing ribs upon the second end surface 44 to provide additional strength and rigidity to the adapter.

A large variety of sizes and types of fluid filters are available, which the adapter of the invention is designed to replace. Such filters differ from each other in diameter, length, shape, gasket or O-ring size, and in the diameter and thread size of the centrally-located bore. The two most popular diameter sizes are 7.5 and 9.25 centimeters. The coupling adapter of the invention readily accommodates these two sizes when the outer diameter of the adapter at first end surface 43 is 9.25 to 9.5 centimeters and the outer diameter of the second or intermediate concentric ridge 53 is approximately 7.5 centimeters.

While it might appear that the larger diameter fluid filters would logically require a larger diameter compressible gasket or O-ring, this is not necessarily the case. The 9.25 centimeter diameter fluid filters on the market appear equally divided between those employing the smaller diameter O-ring and those employing the larger diameter O-ring. It is important, therefore, that a compressible gasket or O-ring of the correct size be used when installing the improved coupling adapter upon the outlet surface or face of the fluid reservoir.

To accommodate the differences in diameter and thread size of the central bores of the many fluid filters in use, the improved adapter may be designed in either of two forms. The diameter of central bore 45 may be selected to have the smallest of the fluid filter bore sizes and provided without threads. This option allows the user to tap central bore 45 with the desired thread size, or to enlarge the diameter of central bore 45, as by boring, and tap for the appropriate thread size, as the installation may require. Alternatively, the central bore 45 may be threaded for the largest of the bore sizes required. Then, appropriately-threaded, reducing nipples or bushings may be supplied which have the desired, internally-threaded sizes as required for the installation. At least four different central bore diameters and two different thread pitch sizes are employed in the majority of the spin-on fluid filters on the market.

The diameter of cylindrically-shaped cavity 49 is determined by the smaller of the popular-size fluid filters which the adapter is designed to replace, and the larger of the popular-size filters determines the diameter of first end surface 43 of the adapter. Thus an increase in surface area is available at first end surface 43 as is required to accommodate concentric ridges 52, 53 and 54 and circular grooves 57 and 58.

By locating cylindrically-shaped outlet port 63 so that its outer edge coincides with the outer peripheral surface 56 of disk-shaped body 42, as shown, an increase in the lateral spacing between outlet port 63 and inlet port 61 may be obtained. With this increased spacing, it becomes possible to threadably insert elbow or 90-degree type pipe fittings into the threaded ports 61 and 63. This feature enables the improved adapter to be used in a number of installations not heretofore possible. With cylindrically-shaped outlet port 63 so positioned, its upper end extends into disk-shaped body 42, terminating below first and second concentric ridges 52, 53 and inner circular groove 57. To achieve an adequate flow of fluid from cylindrically-shaped cavity 49 into the upper end of outlet port 63, an opening 64, extending from the outer peripheral surface 55 of cavity 49 through part of disk-shaped body 42 into the upper end of outlet port 63, is provided, as illustrated in FIG. 4.

The improved coupling adapter of the invention is installed upon the outlet surface of the fluid reservoir housing of the engine or transmission unit in the same general manner as that used to install the spin-on type oil filter which the engine or transmission unit is designed to receive. A gasket or O-ring of the appropriate size is placed within one of the circular grooves 57 or 58. The adapter, with centrally-threaded bore 45 physically engaging the threaded nipple protruding from the fluid reservoir housing, is rotated, causing the adapter to advance until the gasket or O-ring becomes tightly compressed between first end surface 43 and the outlet surface of the fluid reservoir.

The engine oil or transmission fluid to be remotely circulated flows out from the fluid reservoir around the exterior of the threaded nipple and into the cylindrically-shaped cavity 49. From cavity 49 the fluid flows through the opening 64, located at the outer peripheral surface 55 of the cavity, into outlet port 63. From outlet port 63 the fluid is conveyed by suitable hose or tubing (not shown) to the remotely-located filter, cooler, or both, and returned to inlet port 61. The returned fluid flows from inlet port 61 through central passageway 62 into threaded bore 45. From central bore 45 the fluid passes through the center of the threaded nipple of the fluid reservoir housing back into the fluid circulation system of the engine or transmission unit.

The adapter of the invention enables the fluid filter to be conveniently located for easy access by service personnel. Where the installation includes the addition of a fluid cooler, the cooler may be remotely located for efficient heat transfer and for increased circulation of cooling air. The filter and the cooler may be remotely separated from each other if desired.

The improved coupling adapter of the invention is not limited in its use in place of the popular spin-on type oil filter. The improved adapter may be installed, for example, upon the fluid reservoir housing in place of the bolt-on, canister type of filter by attachment to the protruding stud or studs extending from the reservoir housing, or by the use of bolts when needed.

It is apparent that the invention is not limited to threaded inlet and outlet ports, as disclosed. The improved adapter may be provided with ports designed for use with hose and hose clamps or with other suitable couplings, if desired.

Since many changes can be made in the above-described apparatus, and many different embodiments of this invention could be made without departing from the scope thereof, it is intended that all matter contained in the above description or shown in the accompanying drawing shall be interpreted as illustrative and not in a limiting sense.

What is claimed is:

1. An adapter for coupling a remotely-located fluid circulation device to the fluid reservoir of a hydraulic system in place of a fluid filter, comprising in combination:
   (a) a generally disk-shaped body having first and second end surfaces, the first end surface being adapted for abutment adjacent the outlet surface of the fluid reservoir in place of a fluid filter;
   (b) a centrally-located bore extending into said disk-shaped body from said first end surface;
   (c) a cavity extending partially into said disk-shaped body from the first end surface;
   (d) first, second, and third spaced-apart concentric ridges of different diameters formed at the first end surface of said disk-shaped body, said first ridge being adjacent to the outer peripheral surface of said cavity, said third ridge being adjacent to the outer peripheral edge of said disk-shaped body;
   (e) an inner circular groove situated between said first and second concentric ridges and extending partially into said disk-shaped body from the first end surface;
   (f) an outer circular groove situated between said second and third concentric ridges and extending partially into said body from the first end surface, said outer circular groove having a larger diameter than said inner circular groove, one of said inner or outer diameter grooves being adapted for receiving a single O-ring when the adapter is to be attached to the fluid reservoir of a hydraulic system, said inner circular groove receiving an O-ring having a first diameter size when the adapter is used to provide a fluid-tight seal between the first end surface of said disk-shaped body and a fluid reservoir whose outlet surface is of a first diameter size, said outer circular groove being adapted for receiving an O-ring having a second and larger diameter size when the adapter is used to provide a fluid-tight seal between the first end surface of said disk-shaped body and a fluid reservoir whose outlet surface is of a second and larger diameter size;
   (g) an inlet port extending from the second end surface of said disk-shaped body, said inlet port having a passageway extending into said disk-shaped body and interconnected with said centrally-located bore; and
   (h) an outlet port extending from the second end surface of said disk-shaped body, said outlet port having a passageway extending into said disk-shaped body and interconnected with said cavity, said outlet port being situated near the edge of said disk-shaped body and the passageway interconnecting said outlet port with said cavity being situated beneath said first and second concentric ridges and said inner circular groove, said inlet and outlet ports being adapted for coupling the adapter to a remotely-located fluid circulation device.

2. The adapter as defined by claim 1 wherein the portion of said centrally-located bore adjacent the first end surface of said disk-shaped body is threaded for engagement with the threaded nipple of the fluid reservoir.

3. The adapter as defined by claim 1 wherein said cavity is cylindrically-shaped, and wherein said cylindrically-shaped cavity surrounds the central portion of said disk-shaped body, including said bore.

4. The adapter as defined by claim 1 wherein said inlet and outlet ports are cylindrically-shaped.

5. The adapter as defined by claim 1 wherein the passageways of said inlet and outlet ports are parallel to and laterally offset from the axis of said centrally-located bore.

* * * * *